United States Patent [19]

Takeuchi et al.

[11] Patent Number: 5,111,425
[45] Date of Patent: May 5, 1992

[54] SINGLE CHIP COMMUNICATION DATA PROCESSOR WITH DIRECT MEMORY ACCESS CONTROLLER HAVING A CHANNEL CONTROL CIRCUIT

[75] Inventors: Yusuke Takeuchi, Ohme; Sakae Miki, Komae, both of Japan

[73] Assignee: Hitachi Ltd., Tokyo, Japan

[21] Appl. No.: 465,028

[22] Filed: Jan. 16, 1990

[30] Foreign Application Priority Data

Jan. 23, 1989 [JP] Japan ................... 1-13511

[51] Int. Cl.⁵ .................. G06F 13/28; G06F 13/12
[52] U.S. Cl. ......................... 395/425; 364/DIG. 1;
364/DIG. 2; 364/923.6; 364/926.1; 364/926.9;
364/926.92; 364/927.92; 364/927.93;
364/927.94; 364/932.8; 364/933; 364/933.2;
364/933.3; 364/933.4; 364/933.62; 364/939;
364/939.5; 364/239; 364/239.7; 364/242.3;
364/242.31; 364/247; 364/247.2; 364/247.4;
364/247.8; 364/262.4; 364/262.9; 364/251;
364/260.4
[58] Field of Search ................... 364/200, 900

[56] References Cited

U.S. PATENT DOCUMENTS

| | | | |
|---|---|---|---|
| 4,271,466 | 1/1981 | Yamamoto et al. | 364/200 |
| 4,325,119 | 4/1982 | Grandmaison eet al. | 364/200 |
| 4,449,202 | 5/1984 | Knapp et al. | 364/900 |
| 4,514,808 | 4/1985 | Murayama et al. | 364/200 |
| 4,564,900 | 1/1986 | Smitt | 364/200 |
| 4,604,683 | 8/1986 | Russ et al. | 364/200 |
| 4,716,523 | 12/1987 | Burrus, Jr. et al. | 364/200 |
| 4,782,439 | 11/1988 | Borkar et al. | 364/200 |
| 4,878,166 | 10/1989 | Johnson et al. | 364/200 |

*Primary Examiner*—Thomas C. Lee
*Assistant Examiner*—Krisna Lim
*Attorney, Agent, or Firm*—Fay, Sharpe, Beall, Fagan, Minnich & McKee

[57] ABSTRACT

Disclosed is a DMA controller incorporated in a data processor, comprising a plurality of channels and a control circuit for overseeing these channels. Each of these channels has registers for storing transfer parameters (address and byte count), registers for storing control parameters (status and command), data assembler circuit, and a channel control circuit that controls these registers and data assembler circuits. The channel control circuit in each channel simultaneously processes transfer parameters for an increased data transmission rate and a reduction of the internal processing unit work load.

6 Claims, 3 Drawing Sheets

SINGLE CHIP COMMUNICATION DATA PROCESSOR WITH DIRECT MEMORY ACCESS CONTROLLER HAVING A CHANNEL CONTROL CIRCUIT

BACKGROUND OF THE INVENTION

The present invention relates to a single chip data processor containing a DMA (direct memory access) controller and, more particularly, to a single chip data processor incorporating technologies suitably adapted to provide a DMA controller for use with a communication control unit (communication facility or communication adapter).

In a data processor (micro-controller) or in a system comprising data input/output devices, data may be transferred at high speed via a DMA controller between a main memory device (storage device) inside the system and an I/O device configured. An example of this DMA controller is the 82258 advanced direct memory access controller (ADMA) from Intel, a United States corporation. This ADMA is illustratively described in "Nikkei Data Processing and Microcomputer," a Japanese publication, the January 198, issue, MC1-153-401 through 413.

As shown in FIG. 4, the above-cited DMA controller has an address generation unit (ADU) that generates an address of the main storage device, a byte count unit (BCU), a channel command register (CCR), a control status register (CSR) and other components connected to an internal data bus. The entire DMA controller arrangement, along with its associated components, is controlled by a central control unit (CCU).

SUMMARY OF THE INVENTION

DMA controllers such as the one outlined above have been utilized in areas where high-speed data transmission is required. Typically, a DMA controller is configured in a communication control unit for a integrated service digital network (ISDN). As the rate of transmitting data via this communication controller has increased in conventional setups, the applicants of this invention has found, the following problems have occur.

The commands for and the status of each channel of the DMA controller are controlled by the central control unit (CCU). Predictably, higher rates of data transmission increase the work load on the CCU. This in turn reduces the throughput of the DMA controller, restricting the transmission rate of the communication controller and the ISDN.

It is therefore an object of the present invention to provide a DMA controller that boosts throughput.

It is another object of the present invention to provide a DMA controller with enhanced capabilities that improve the data transmission rate of the communication controller and the ISDN that comprises it.

The above and other related objects and features of the invention, as well as the novelty thereof, will clearly appear from the following description and from the accompanying drawings.

The present invention may be illustratively outlined as follows. The DMA controller contained in the communication control unit (data processor) for use with an integrated service digital network (ISDN) comprises a plurality of channels. Each channel comprises registers which retain transfer parameters such as a transfer address and transfer byte count, and control parameters including command and status information; a control circuit (channel control circuit) which controls the parameters retained in these registers; and a data assembler means which assembles communication data. In addition, the DMA controller contains a transfer control that controls the channel control circuit of each channel.

The channel control circuit of each channel, together with the other circuit described above, reduces the work load on the transfer control of the DMA controller. Furthermore, it becomes possible to carry out two kinds of processing simultaneously on a plurality of channels: processing the control parameter, the transfer parameters, and assembling communication data. As a result, the throughput of the DMA controller is increased, which in turn translates into a higher rate of data transmission for the communication control unit comprising the DMA controller and the ISDN.

PREFERRED EMBODIMENTS OF THE INVENTION

Figure 1:
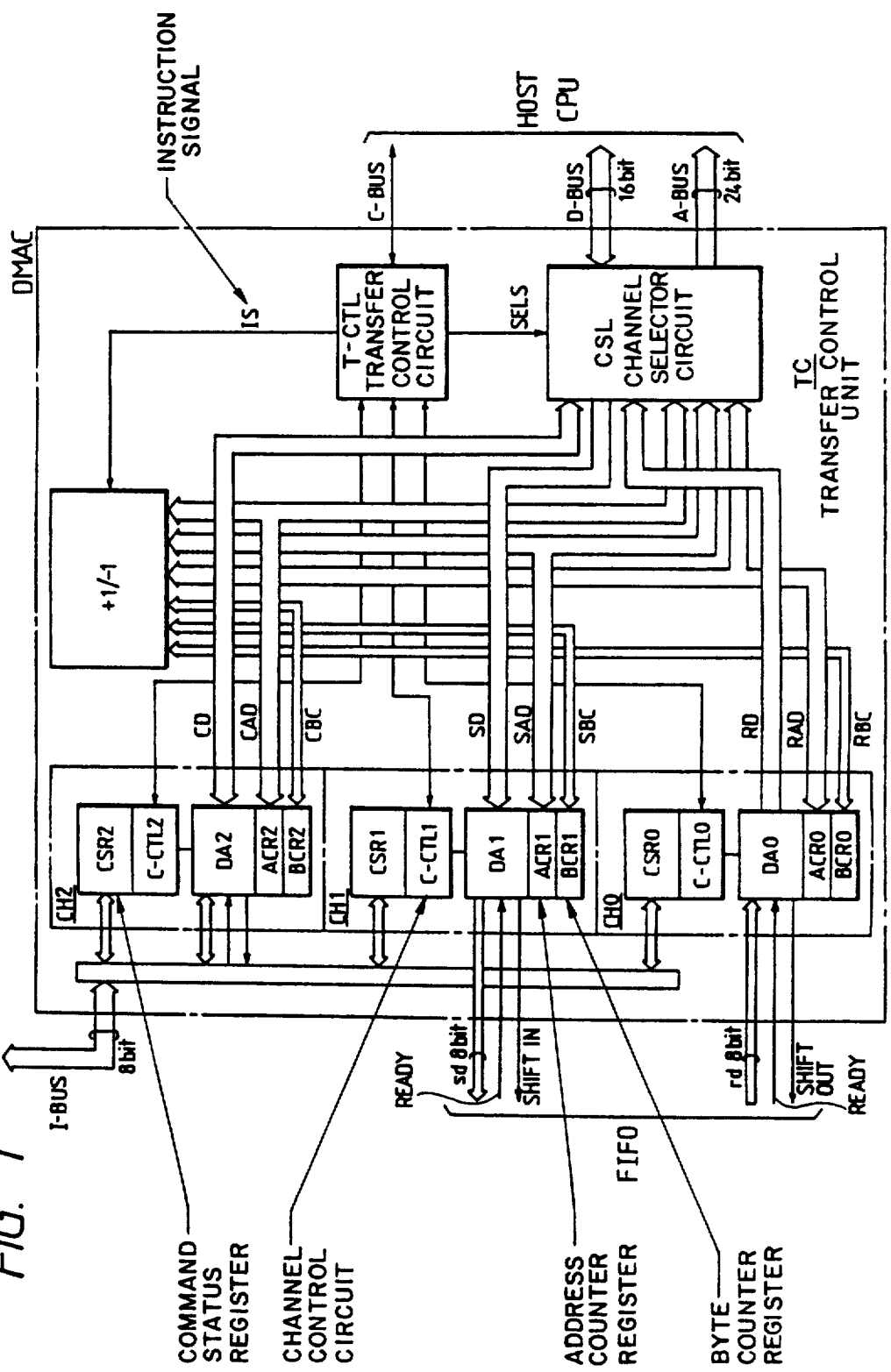
FIG. 1 is a block diagram illustrating a preferred embodiment of a DMA controller (DMAC) according to the present invention.
Figure 2:
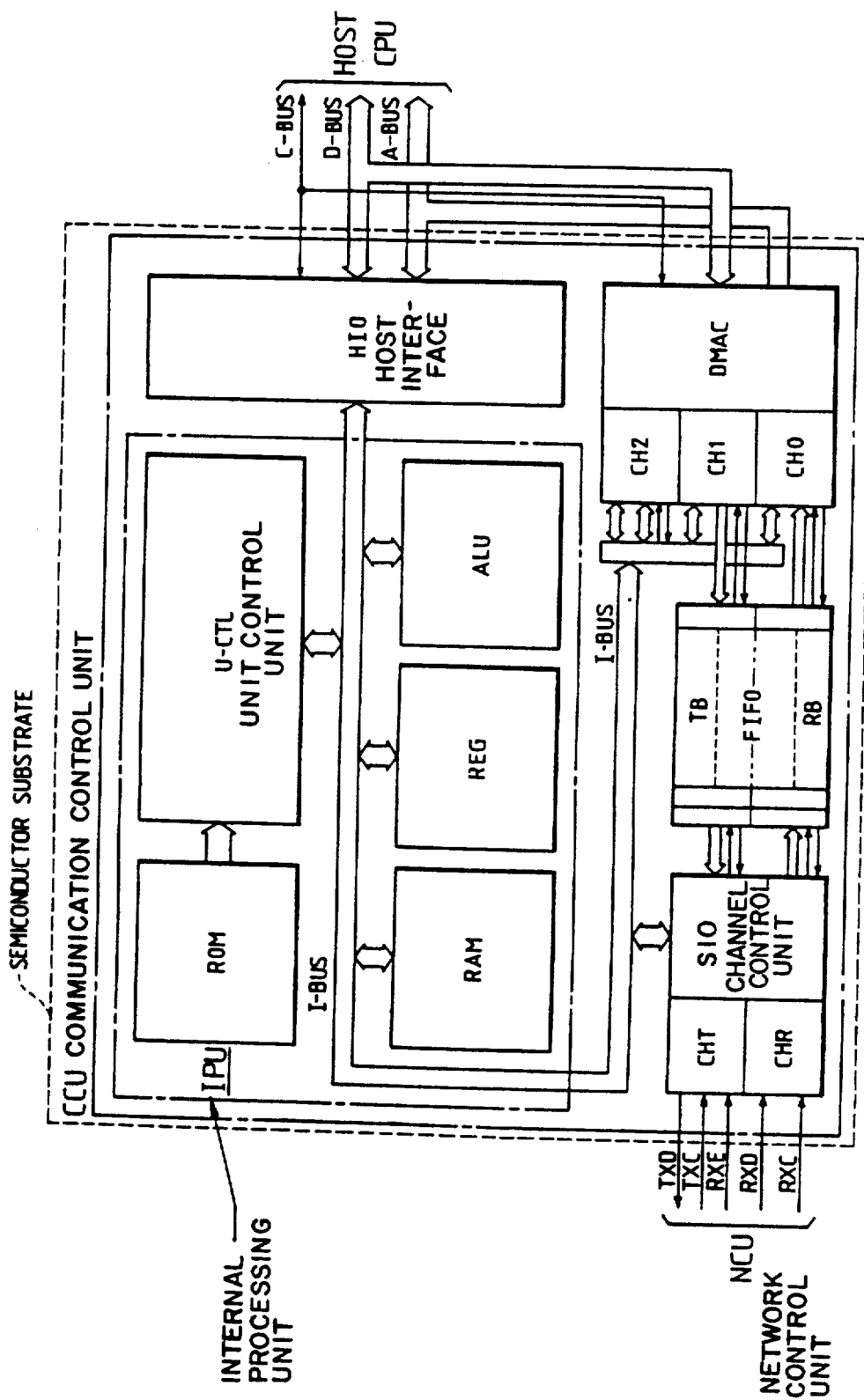
FIG. 2 is a block diagram depicting a preferred embodiment of a communication control unit comprising the DMA controller (DMAC) shown in FIG. 1.
Figure 3:
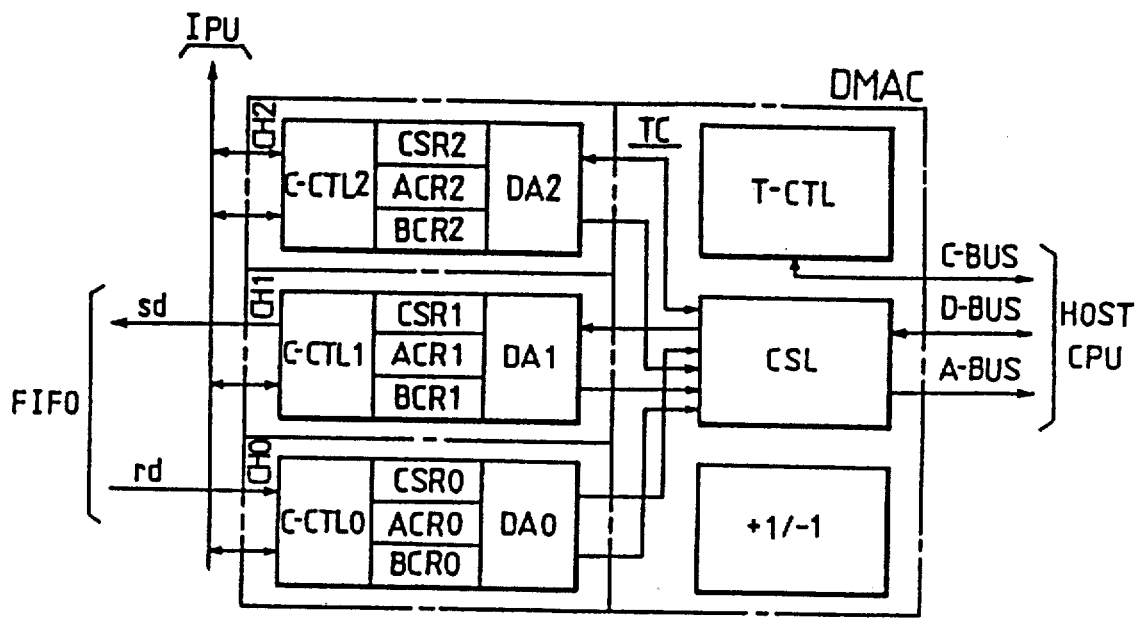
FIG. 3 is a conceptual view showing the divisions of functions implemented by the DMA controller (DMAC) in FIG. 1.

FIG. 1 is a block diagram showing how a direct memory access controller (DMAC) may be illustratively configured according to the present invention. FIG. 2 is a block diagram depicting how a communication control unit (CCU) comprising the DMA controller (DMAC) of FIG. 1 may be typically configured. FIG. 3 illustrates conceptually how the functions are divided in the DMA controller (DMAC) of FIG. 1. By referring to these figures, the DMA controller (DMAC) and the communication control unit (CCU), as they illustratively embody the present invention, will now be described in terms of construction, operation and characteristic. It is to be noted that the circuit elements making up each block in FIG. 2 are formed of N-channel MOS FET's and P-channel MOS FET's. These elements are made by the known CMOS process onto a single semiconductor substrate illustratively formed of monocrystal silicon, as indicated by the dotted line rectangle. Although not shown in FIG. 2, it should be understood that the blocks on the semiconductor substrate exchange signals with the outside via external terminals provided on the substrate.

The communication control unit (CCU) of the preferred embodiment is used in, but not limited by, the subscriber equipment or local switches of an integrated service digital network (ISDN). In this setup, the communication control unit (CCU) acts as a link access procedure in the D channel (LAPD) controller, supporting data communication between computers that comply with the LAPD (link access procedure on the D channel) protocol.

It should be noted that the integrated service digital network (ISDN) is a digital data communication network that integrates digital data and image information for communication; Digital data are typically used by telephone stations, facsimile machines and personal computers. Image information is handled notably by picture phones and video conference equipment. Should also to be noted that the LAPD protocol is a communication protocol defined by Recommendation Q.920/921 (I.440/441) of the CCITT (Comité Consultatif International Télégraphique et Téléphonique).

The communication control unit (CCU) comprises, but is not limited by, a host interface (HIO) and the DMA controller. Through these components, the communication control unit (CCU) is connected to a control bus (C bus), a data bus (D bus) and an address bus (A bus) of the host system.

The communication control unit (CCU) also has a channel control unit (SIO) containing a transmitting channel (CHT) and a receiving channel (CHR). Through these components, the CCU is illustratively connected to a network control unit (NCU) and, via the NCU, to a communication line of the ISDN as well. Meanwhile, there is provided a computer, not shown, connected to a host processor (host CPU), also not shown, via the above-mentioned communication line and network control unit (NCU). The communication control unit (CCU) is capable of transferring a series of data between the computer and the host processor in accordance with a predetermined communication protocol. This makes it possible for the host processor and its subordinate computers, not shown, to exchange communication data among themselves without becoming aware of the existence of communication lines or of the communication protocol involved.

In FIG. 2, the communication control unit (CCU) comprises an internal processing unit (IPU). The internal processing unit (IPU) contains, but is not limited by, a unit control circuit (U-CTL), an arithmetic and logic unit (ALU), registers (REG), a ROM (read only memory), and a RAM (random access memory). Of these components, the unit control circuit (U-CTL), arithmetic and logic unit (ALU), registers (REG) and random access memory (RAM) are interconnected via an internal bus (I bus). The internal bus is connected to a host interface adapter (HIO) at one end, and to the DMA controller (DMAC) at the other end.

The unit control circuit (U-CTL) oversees, but is not limited by, the functions of the internal processing unit (IPU) along with the arithmetic and logic unit (ALU), so as to control the communication control unit (CCU) in operation. The unit control circuit (U-CTL) is used, but not limited, as a microprogram-based control circuit. This circuit executes communication processes designated by a series of macro instructions read from the random access memory (RAM), the execution being performed in accordance with a series of microinstructions read from the read only memory (ROM) based on these macro instructions.

The random access memory (RAM) may illustratively be formed of an erasable semiconductor memory such as a CMOS dynamic RAM. It temporarily stores fixed data as well as macro instructions for controlling the communication protocol. These macro instructions and fixed data are usually placed in the main memory device of the host system, and are transferred as needed to the random access memory (RAM) of the communication control unit (CCU). As described later in more detail, the DMA controller (DMAC) of the communication control unit (CCU) has three channels. Of these channels, the third (CH2) channel supports continuous transfer (DMA transfer) of macro instructions and fixed data between the random access memory (RAM) and the main memory device of the host system.

The read only memory (ROM) may illustratively be a mask ROM, EPROM or EEPROM; the memory accommodates a group of microprograms corresponding to the above-mentioned macro instructions. In this embodiment, the addresses of the read only memory (ROM) are specified by a sequencer, not shown, which is provided in the unit control circuit (U-CTL).

The registers (REG) are made of a plurality of general registers, command registers and status registers. These registers temporarily contain data during the calculating process, and/or hold a command and status information for the communication control unit (CCU). The command and status registers are accessed directly by the host processor (host CPU) via the host interface (HIO).

The communication control unit (CCU) of this embodiment further comprises a DMA controller (DMAC), a channel control unit (SIO) and a first-in-first-out buffer (FIFO).

The channel control unit (SIO) has two channels: a transmitting channel (CHT) and a receiving channel (CHR). The transmitting channel (CHT) is to, but not limited by, the network control unit (NCU) via a data transmission line (TXD), a transmission clock line (TXC) and a reception echo bit line (RXE). The transmitting channel (CHT) converts the data transferred in parallel from the buffer (FIFO) into serial data in synchronization with a transmission clock signal. After this, the data is transmitted over the data transmission line (TXD) to the network control unit (NCU). The transmitting channel also has a capability to add predetermined control codes to the transmitted data in accordance with the communication protocol.

The receiving channel (CHR) of the channel control unit (SIO) is connected to the network control unit (NCU) via the data receiving line (RXD) and clock receiving line (RXC). In synchronization with a reception clock signal, the receiving channel (CHR) receives data that is serially inputting from the network control unit (NCU) via the data receiving line (RXD). The data, after being converted to parallel format, is transmitted to the buffer (FIFO). The receiving channel also has a capability to extract predetermined control codes from the data thus received.

The buffer (FIFO) may illustratively comprise a transmission buffer (TB) and a reception buffer (RB), retaining temporarily 20-byte transmitted data and 20-byte received data respectively, on a first in, first out basis.

The input terminal of the transmission buffer (TB) is connected to the second channel (CH1) of the DMA controller (DMAC). The output terminal of the transmission buffer (TB) is connected to the transmitting channel (CHT) of the channel control unit (SIO). The transmission buffer (TB) receives data transmitted in bytes (in units of 8 bits) from the channel (CH1) of the DMA controller (DMAC). Upon receiving request signals from the channel control unit (SIO), the transmission buffer (TB) transmits the data to the transmitting channel (CHT).

Meanwhile, the input terminal of the reception buffer (RB) is connected to the receiving channel (CHR) of the channel control unit (SIO). The output terminal of the reception buffer (RB) is connected to the first channel (CH0) of the DMA controller. The reception buffer (RB) receives data in bytes (in units of 8 bits) from the receiving channel (CHR) of the channel control unit (SIO). On receiving instructions from the DMA controller (DMAC), the reception buffer (RB) transmits the data to the first channel (CH0).

As shown in FIG. 1, the DMA controller (DMAC) comprises three channels (CH0–CH2) and a transfer control (TC) that controls these channels. The first channel (CH0) of the DMAC is assigned to the receiving channel (CHR) of the channel control unit (SIO), as described above. The second channel (CH1) is assigned to the transmitting channel (CHT). The third channel (CH2) of the DMAC is connected to the internal bus (I bus), as described above, and supports the continuous transmission of programs and fixed data between the random access memory (RAM) of the internal processing unit (IPU) and the main memory device of the host system.

As depicted in FIG. 1, the channels CH0 through CH2 of the DMA controller (DMAC) in this embodiment comprises address counter registers ACR0 through ACR2, byte counter registers BCR0 through BCR2, and command status registers CSR0 through CSR2. The address counter registers retain a transfer address which is a transfer parameter; the byte counter registers hold a transfer byte count which is another transfer parameter; and the command status registers contain command and status information, which is a control parameter. The channel CH0 through CH2 further comprises data assemblers DA0 through DA2, and channel control circuits C-CTL0 through C-CTL2 which oversee the data assemblers. Meanwhile, the transfer control unit (TC) of the DMA controller (DMAC) comprises a channel selector circuit (CSL) that routes transmitted and received data and programs to each of the channels as required, an increment/decrement circuit ($+1/-1$), and a transfer control circuit (T-CTL) that controls the CSL, the $+1/-1$ and the channels CH0 through CH2.

The address counter registers ACR0 through ACR2 of the channels CH0 through CH2 are 24-bit registers. These registers specify the address that is to be accessed next in the main memory device of the host system. Prior to the state of communication or program transfer, the start address of the transmitted data area, received data area or program storage area is written by the host processor (host CPU) into the address counter registers (ACR0 through ACR2) via the data bus (RAD, SAD, CAD). The address thus written in the register is incremented by 1 by the increment/decrement circuit ($+1/-1$) of the transfer control unit (TC) via the data bus (RAD, SAD, CAD) every time a transfer process is carried out by the transfer control (TC). In this manner, the address in the registers is updated. The channels CH0 through CH2 are also capable of making a chain judgment on transmitted or received data during address updating.

The byte counter registers BCR0 through BCR2 of the channels CH0 through CH2 are eight-bit registers each. These registers specify the number of remaining bytes of the transmitted/received data or program to be transferred continuously over the channels. Prior to the start of data communication or program transfer, the total number of bytes in the transmitted/received data or program to be transferred is written by the host processor (host CPU) into the byte counter registers (BCR0 through BCR2). The byte count written in these registers is decremented by 1 by the increment/decrement circuit ($+1/-1$) of the transfer control (TC) via the bus (RBC, SBC, CBC) every time a transfer process is carried out by the transfer control (TC). In this manner, the byte count is updated. The channels CH0 through CH2 are also capable of judging the number of remaining bytes upon byte count updating, thereby generating status data.

The command status registers CSR0 through CSR2 of the channels CH0 through CH2 are registers with a capacity of a plurality of bytes. These registers retain data for designating an operation instruction, i.e., a command, directed at each of the channels CH0 through CH2; the registers also retain data for specifying a plurality of statuses indicating the result of operations by the channels. The command data for each of the channels CH0 through CH2 is written, as needed, by the internal processing unit (IPU) into the relevant register (CSR0 through CSR2) via the internal bus (I bus). The status data from each of the channels CH) through CH2 is polled by the internal processing unit (IPU) via the internal bus (I bus).

The data assembler DA1 or DA 2 for the channels CH1 and CH2 takes data or a program receiver in units of two bytes (16 bits) over the data bus (SD or CD) from the host system, and transfers the data or program in bytes (8 bits) to the buffer (FIFO) over the bus (SB) or to the internal processing unit (IPU) over the internal bus (I bus). The assembler DA0 or DA2 takes the received data or control data supplied by the buffer (FIFO) or internal processing unit (IPU) in units of eight bits, assembles the data in units of two bytes, and transfers the data in units of 16 bits to the host system over the data bus RD or CD. The data assemblers DA0 through DA2 are provided with two-byte data registers. The data assemblers DA0 through DA2 are capable of selectively specifying these registers when assembling data.

The channel control circuit C-CTL0 through C-CTL2 of the channels CH0 through CH2 oversee the registers (ACR0–ACR2, BCR0–BCR2, CSR0–CSR2) and the data assemblers DA0 through DA2, and controls the operations thereof. To implement these functions, the channel control circuits (C-CTL0 through C-CTL2) decode the command data inputted to the command status registers CSR0 through CSR2, and judges the result of operations made by various components under its control to generate relevant status data. The channel control circuit C-CTL0 through C-CTL2 exchange necessary control signals with the buffer (FIFO), internal processing unit (IPU) and transfer control circuit (T-CTL) so as to perform smoothly the transfer process over the channels CH0 through CH2.

In accordance with a selection signal (SELS) from the transfer control circuit (T-CTL), the channel selector circuit (CSL) of the transfer control (TC) sees to it that the channels CH0 through CH2 selectively exchange the transmitted or received data or program data with the host system, and selectively transmit the transfer address data thereto. As described above, the data bus (D bus) between the channel selector circuit (CSL) and the host system is 16 bits wide, and the address bus (A bus) therebetween is 24 bits wide. Thus the transfer data and transfer address data are selected by the channel selector circuit (CSL) in units of 16 bits or 24 bits.

The increment/decrement circuit (+1/−1) of the transfer control (TC) increments the address counter registers ACR0 through ACR2 of the channels CH0 through CH2, and decrements the byte counter registers BCR0 through BCR2 thereof, in accordance with an instruction signal (IS) from the transfer control circuit (T-CTL).

The transfer control circuit (T-CTL) of the transfer control (TC) oversees the channel control circuits C-CTL0 through C-CTL2 of the channels CH0 through CH2, the channel selector circuit (CSL) and the increment/decrement circuit (+1/−1), and controls the operation thereof. The transfer control circuit (T-CTL) is connected to the control bus (C bus) of the host system. This arrangement affords the circuit (T-CTL) a capability to perform necessary bus-related processing with respect to the host system.

Figure 4:
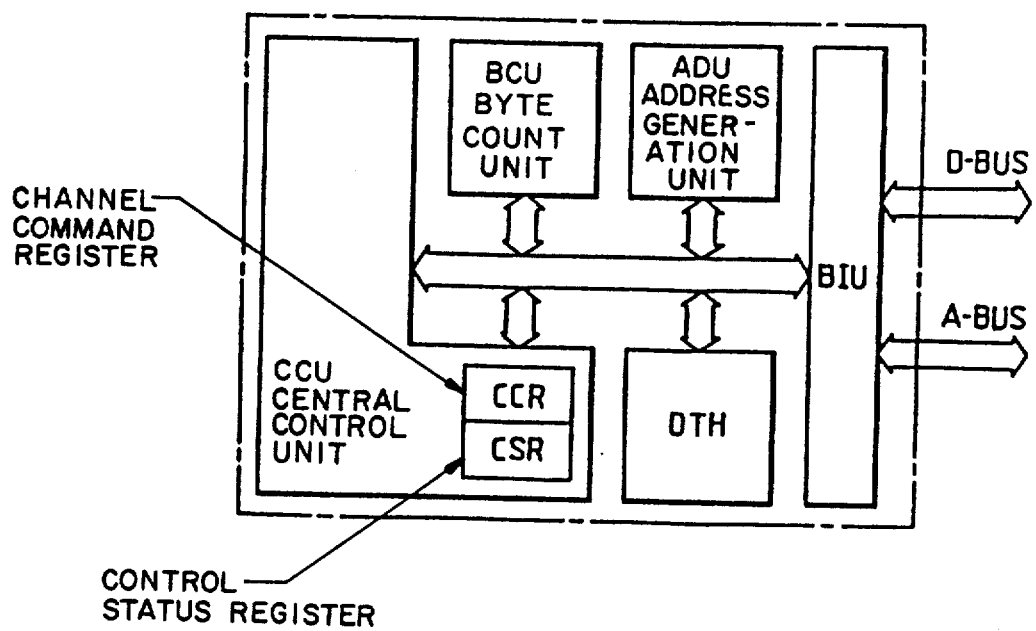
FIG. 4 is a conceptual view illustrating the divisions of functions implemented by a prior art DMA controller (DMAC).

The communication control unit (CCU) of this embodiment acts as an LAPD controller for an integrated service digital network (ISDN), supporting data communication between computers that comply with the LAPD protocol. The communication control unit (CCU) comprises a DNA controller (DMAC) having three channels CH0 through CH2 and a transfer control (TC) that oversees these channels. In this embodiment, as shown in FIG. 3, the channels CH0 through CH2 of the DMA controller (DMAC) comprise address counter registers ACR0 through ACR2 which retain a transfer address (transfer parameter), byte counter registers BCR0 through BCR2 which hold a transfer byte count (transfer parameter) and command status registers CSR0 through CSR2 which accommodate a command and status information (control parameter). The channels also have data assemblers DA0 through DA2 for assembling the transmitted and received data to be transferred, and channel control circuits C-CTL0 through C-CTL2 that oversee these assemblers to carry out data transfer procedure. This arrangement allows the DMA controller (DMAC) of this embodiment to let each of the channels CH0 through CH2 control the transfer and the control parameters and assemble the transfer data independently of one another. In this manner, the DMA controller (DMAC) of the present invention requires significantly less work load on the transfer control (TC) than the central control unit (CCU) of the prior art DMA controller illustrated in FIG. 4. At the same time, a plurality of channels may perform their own processing in parallel. As a result, the throughput of the DMA controller (DMAC) is improved. This in turn translates into higher rates of data transmission for the communication control unit comprising the DMA controller (DMAC) and for the integrated service digital network (ISDN) comprising these units. The efficiency of data communication is greatly enhanced.

As indicated above, when the present invention is applied to a DMA controller included in communication control equipment of an integrated service digital network, the following benefits are obtained:

(1) In a DMA controller contained in communication control equipment of an integrated service digital network (ISDN), the channels thereof are equipped with registers, channel control circuits (C-CTL0 through C-CTL2) and data assemblers (DA0DA2). The register are provided to store transfer and control parameters such as transfer address, transfer byte count, command and status information. The channel control circuits control transfer and the control the parameters independently in each of the channels. The data assemblers assemble communication data also independently. This setup considerably reduces the work load on the transfer control (TC) of the DMA controller.

(2) The setup described in (1) above allows the channels to control the transfer and control parameters and the to assemble communication data independently of one another. This means that these processes may be performed in parallel by a plurality of channels.

(3) The benefits of (1) and (2) above combine to boost substantially the throughput of the DMA controller.

(4) The benefits of (1) through (3) above combine to enhance rates of data transmission for the communication control unit comprising the DMA controller and also for the integrated service digital network (ISDN) comprising these units.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations that fall within the spirit and scope of the appended claim. For example, in FIG. 1, the number of channels provided in the DMA controller may be two, or more than three. The bit widths may be other than those illustratively allocated to the data bus (D bus), address bus (A bus) and their associated signal conductors. If the data and address signal conductors between the transfer control (TC) and the channels are logic connections, there is no substantial need for a channel selector circuit (CSL). The increment/decrement circuit (+1/−1) of the transfer control unit (TC) may be provided for in each channel. The address counter registers ACR0 through ACR2, byte counter registers BCR0 through BCR2 and command status registers CSR0 through CSR2 may be gathered together and installed in a single channel section or in some other limited location, provided that they are controlled individually by any of the channels installed. In FIG. 2, the first-in, first-out buffer (FIFO) may be accessed via the internal bus (I bus). The communication control unit (CCU) may comprise a plurality of substantially similar channel control units (SIO). In this case, the comparable number of channels should be added to the DMA controller. The components of the communication control unit (CCU) may be formed singly on separate semiconductor substrates or in combination on a single semiconductor substrate. Furthermore, the block configuration of the DMA controller shown in FIG. 1, that of the communication control unit (CCU) in FIG. 2, and the bus construction between units may take a variety of forms when embodied.

The above description has covered applications of the invention to a DMA controller contained in an LAPD controller which is a communication control equipment of an integrated service digital network (ISDN). However, the invention is not limited to the above-described applications; the invention may also be applied to a DMA controller that is used alone or to a DMA controller included in communication control equipment or computer systems that comply with other communication protocols. The invention may also be applied extensively to a DMA controller that has at least two channels and a transfer control unit that oversees these channels, or to digital equipment that contains such a DMA controller.

We claim:

1. An integrated communication data processor for use with a host processor and a main memory device, said integrated communication data processor comprising:

an internal processing unit for executing communication processing in accordance with predetermined instructions;

a receiving means for receiving serial data inputted to the integrated communication data processor and for transforming the serial data into parallel data;

a receiving buffer means coupled to the receiving means for storing the parallel data and for providing the parallel data in units of bytes; and, a direct memory access control means for transmitting the parallel data stored in the receiving buffer means to the main memory device, wherein the direct access memory control means transmits the parallel data independently of the internal processing unit, the direct memory access control means including:

an address register for storing address data transmitted by the host processor, said address data representing an address in the main memory device to which the parallel data will be transmitted;

an increment means for incrementing the address data when a parallel data byte is transmitted to the main memory device;

a byte count register for storing transfer byte count data transmitted by the host processor, said transfer byte count data representing the number of parallel data bytes to be transmitted to the main memory device;

a decrement means for decrementing the transfer byte count data when one parallel data byte is transmitted;

a control circuit means for overseeing the byte count data and for providing a status data based upon the transfer byte count data;

a data assembler for assembling the parallel data in units of two bytes before said parallel data is transferred to the main memory device and wherein the control circuit means controls the data assembler; and, a status register means for storing the status data transmitted by the control circuit means, wherein said status data is polled by the internal processing unit.

2. The integrated communication data processor according to claim 1, wherein the direct memory access control means further comprises a register means for storing a command data transmitted by the internal processing unit, said command data representing an operation instruction of the direct memory access control means, and wherein the control circuit means further includes a decoder for decoding the command data.

3. An integrated communication data process for use with a host processor and a main memory comprising:

an internal processing unit for executing communication processes in accordance with predetermined instructions;

a receiving means for receiving a first serial data inputted to the integrated communication control processor and for transforming said first serial data into a first parallel data;

a receiving buffer means coupled to the receiving means for storing the first parallel data;

a transfer buffer means for storing a second parallel data;

a transfer means for transforming said second parallel data into a second serial data and for transmitting the second serial data;

a direct memory access controller having first channel portion in which the first parallel data is transmitted from the receiving means to the main memory device, the transmission occurring without internal processing unit control, and a second channel portion in which second parallel data stored in the main memory is transmitted to the transfer buffer means, the transmission occurring without internal processing unit control, wherein the first channel portion includes a first address register for storing a first address data transmitted by the host processor, said first address data representing an address in the main memory to which the first parallel data will be transmitted, and the second channel portion includes a second address register for storing a second address data transmitted by the host processor, said second address data representing an address in the main memory device at which the second parallel data is stored;

a first byte register for storing a first transfer byte count transmitted by the host processor, said first transfer byte count representing a number of first parallel data bytes to be transmitted to the main memory device;

a second byte register for storing a second transfer byte count data transmitted by the host processor, said second transfer byte count data representing a number of second parallel data bytes to be transmitted to the transfer buffer means;

said direct memory access controller further having:

an increment means for selectively incrementing the first or second address data when a corresponding first or second parallel data byte is transferred;

a decrement means for decrementing the first or second transfer byte count data when a corresponding first or second parallel data byte is transferred;

wherein the first channel portion further has:

a first control circuit means for overseeing the first transfer byte count and for providing a first status data based upon the first transfer byte count data;

a first status register for storing the first status data transmitted by the first control means, wherein the first status data is polled by the internal processing unit; and, wherein the second channel portion further has:

a second control circuit means for overseeing the second transfer byte count and for providing a second status data based upon the second transfer byte count data; and, a second status register for storing the second status data transmitted by the second control circuit means, wherein the second status data is polled by the internal processing means.

4. The integrated communication control processor according to claim 3 wherein the first and second channel portions include a command register means for storing a corresponding first or second command data transmitted by the internal processing unit, said first or second command data representing an operation instruction for the corresponding first or second channel portion, and wherein the first and second control circuit means include a decoder means for decoding the corresponding first or second command data.

5. The integrated communication control processor according to claim 3 wherein the receiving buffer means provides the parallel data in units of bytes, wherein the first channel portion includes a first data assembler for assembling the first parallel data in units of two bytes before said parallel data is transferred to the main memory device, and wherein the first control circuit means controls the first data assembler operation.

6. The integrated communication control processor according to claim 3 wherein provided data is received by the direct memory access controller in units of two bytes from the main memory, wherein the second channel portion includes a data assembler means for disassembling the provided data into units of one byte before said data is transferred to the transfer buffer means, and wherein the second control circuit means controls the second data assembler.

* * * * *